United States Patent [19]

Mehesch et al.

[11] Patent Number: 5,560,736
[45] Date of Patent: Oct. 1, 1996

[54] PROCESS FOR SEALING OUT WATER LEAKAGE FROM GEOLOGICAL ROCK FORMATIONS

[75] Inventors: Hans E. Mehesch, Essen; Wolfgang Cornely, Gladbeck; Dieter Wobig, Essen; Martin Fischer, Oberhausen; Oliver Czysollek, Essen, all of Germany

[73] Assignee: Bergwerksverband GmbH, Essen, Germany

[21] Appl. No.: 433,449

[22] PCT Filed: Nov. 10, 1993

[86] PCT No.: PCT/EP93/03142

§ 371 Date: Jul. 10, 1995

§ 102(e) Date: Jul. 10, 1995

[87] PCT Pub. No.: WO94/11461

PCT Pub. Date: May 26, 1994

[30] Foreign Application Priority Data

Nov. 10, 1992 [DE] Germany .......................... 42 37 836.2

[51] Int. Cl.[6] .................................................... B65G 5/00
[52] U.S. Cl. .............. 405/53; 405/264; 166/295
[58] Field of Search .......................... 405/53, 263, 264; 166/295

[56] References Cited

U.S. PATENT DOCUMENTS

| Re. 31,946 | 7/1985 | Meyer et al. | 405/264 |
|---|---|---|---|
| 3,367,892 | 2/1968 | Jorczak et al. | |
| 3,719,050 | 6/1973 | Asao et al. | 61/36 |
| 3,798,186 | 3/1974 | Nakade et al. | 260/2.5 |
| 4,097,587 | 6/1978 | Soma et al. | 260/45.8 |
| 4,113,014 | 9/1978 | Kubens et al. | 166/295 |
| 4,114,382 | 9/1978 | Kubens et al. | 405/264 |
| 4,329,442 | 5/1982 | Pokorny | 528/49 |
| 4,365,670 | 12/1982 | McLaughlin | 166/295 |
| 4,440,901 | 4/1984 | Reiff et al. | 524/591 |
| 4,454,252 | 6/1984 | Meyer | 521/110 |
| 4,475,847 | 10/1984 | Cornely et al. | 405/264 |
| 4,497,663 | 2/1985 | Fisher et al. | 405/53 X |
| 4,715,746 | 12/1987 | Mann et al. | 405/264 |

FOREIGN PATENT DOCUMENTS

| 0143304 | 10/1984 | European Pat. Off. . |
| 3502997 | 7/1986 | Germany . |

*Primary Examiner*—Roger J. Schoeppel
*Attorney, Agent, or Firm*—Vickers, Daniels & Young

[57] ABSTRACT

A method is described, using a polyurethane resin mixture, for sealing off points through which water enters geological rock formations. The method utilizes an isocyanate component (a) and a polyol component (b), to be intimately mixed in a static mixer. The mixture is introduced under pressure into the rock formation through boreholes or injection lances. Primary or secondary di or polyamines are substituted for a portion of the polyol component (b) in quantities such that the polyol remains in excess. These amines greatly accelerate the gelation time for the resin, resulting in an instantaneous increase in viscosity of the gel.

13 Claims, 1 Drawing Sheet

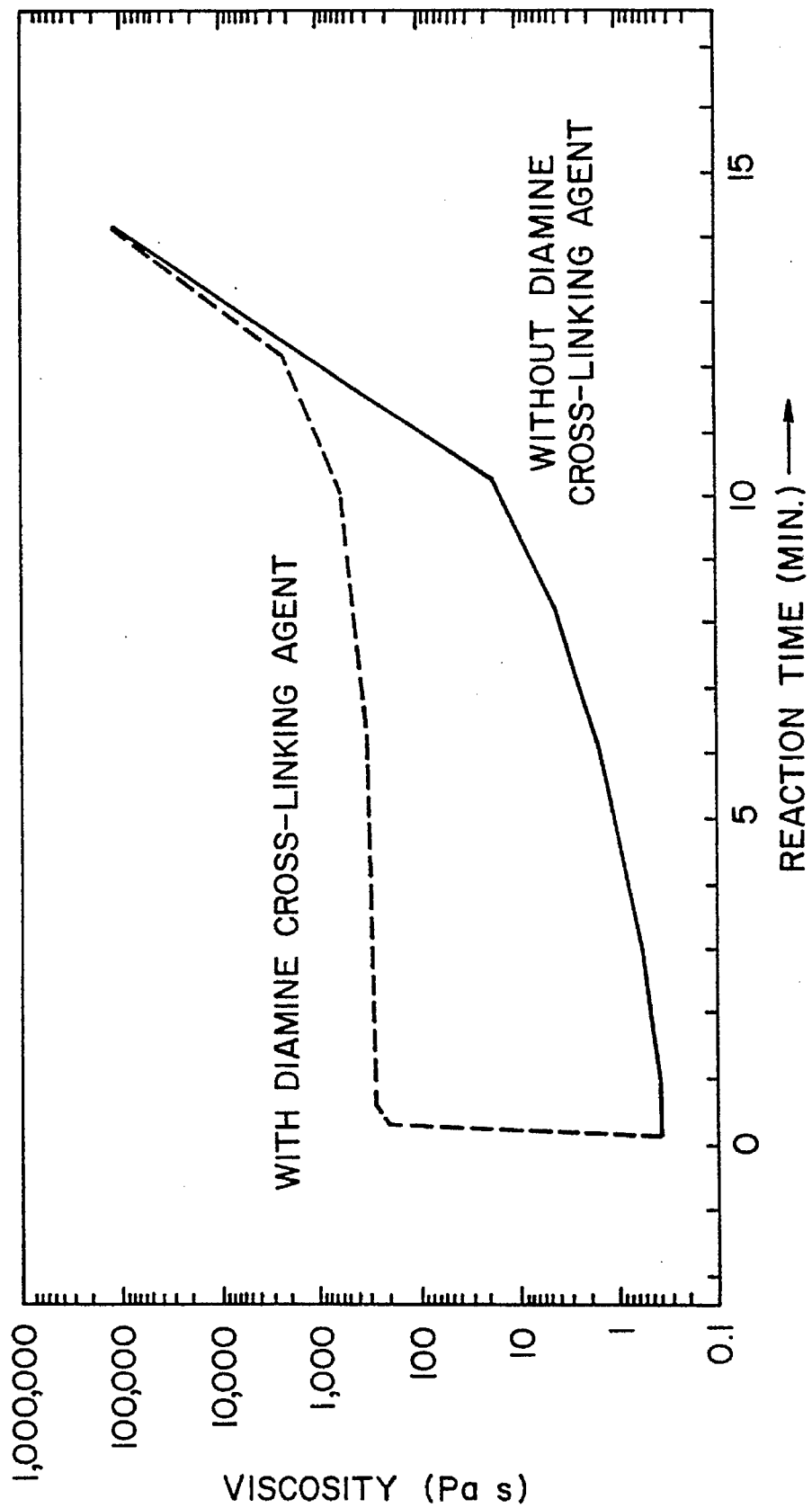

PROCESS FOR SEALING OUT WATER LEAKAGE FROM GEOLOGICAL ROCK FORMATIONS

The invention concerns a method for sealing out water leakage from geological rock formations according to the general idea of the claim.

It is known from U.S. Pat. No. 4,454,252 how to inject fast-reacting polyurethane binary component systems of polyol and isocyanate to stop and seal water leakage from geological rock formations. The two components are blended in a static mixer immediately before entering the rocks. When making contact with water, they form a foam and harden without water and without forming foam. Since the initially injected material displaces the water, the subsequently injected resin forms an unfoamed and, thus, permanently dense water block. However, if the water leakage is considerable, the two components become intensively mixed with the water before the reaction can occur. The result is that the water and polyol form a stable emulsion and the water-insoluble isocyanate reacts to form polyurea in the form of a brittle foam or sludge, so that a water seal can no longer be achieved.

The purpose of the invention is to provide a method for reliable sealing of even heavy water leakage.

This purpose is achieved, according to the invention, by the characteristic features of the patent claim.

Tests have revealed, surprisingly, that the binary synthetic resin mixture according to the invention takes on a gellike consistency several seconds after the mixing, i.e., generally before leaving the injection lance. Even heavy water flow is not able to break up this mixture, so that the resin hardens undisturbed and only produces foam at its surface, due to the water contact.

In the binary polyurethane resin according to the invention, the isocyanate component is reacted with a polyol component, which contains an unsaturated moiety of primary and secondary diamines or polyamines. The amino compounds react much more quickly than the hydroxyl compounds with these isocyanates. The reaction of the slight amount of amine in the polyol component surprisingly accomplishes a significant increase in viscosity in a few seconds, imparting quasithixotropic properties to the system. The resin mixture no longer flows by gravity, and it must be moved by pump pressure.

The polyisocyanate component a) to be used in the process according to the invention comprises, preferably, polyphenyls-polymethyls-polyisocyanates, such as are produced by aniline/formaldehyde condensation and subsequent phosgenation ("polymeric MDI") or derivates of these polyisocyanates that are liquid at room temperature and possess carbodiimide, biuret, urethane and/or allophanate groups, as well as their prepolymeres, i.e., products of the reaction of polyisocyanates with polyols in deficit quantity. The polyols to be considered for preparation of prepolymeres are the generally known compounds from polyurethane chemistry, preferably long-chain polyols with OH-index below 150 mg KOH/g of substance. The polyisocyanate mixtures that are liquid at room temperature and are produced by phosgenation of aniline/formaldehyde condensates ("polymeric MDI"), as well as their liquid, NCO-group-containing products of reaction with deficient quantities (NCO/OH molar ratio=1:0.005 to 1:0.3) of polyvalent alcohols in the molecular weight range of 62–3000, especially polyols containing ether groups in the molecular weight range of 106–3000, are preferred. Liquid mixtures (at room temperature) of 2,4'- and 4,4'-diisocyanatodiphenylmethane are also suitable as polyisocyanate components a). But basically other polyisocyanates can also be considered according to the invention, such as those familiar from, e.g., DE-OS 28 32 253, page 10 and 11. Most especially preferred are polyisocyanate mixtures of the diphenylmethane series with a viscosity at 25° C. of 50–500 mPa.s with an NCO content of around 30–32 wt. %.

The polyol component b) comprises mixtures of organic polyhydroxyl compounds with OH-index between 30 and 2000, while the OH-index of the mixture is between 200 and 500 mg KOH/g of substance.

The polyhydroxyl compounds are preferably the polyether polyols familiar from polyurethane chemistry or mixtures of various polyether polyols of this type. Suitable polyether polyols are, for example, propoxylation products of divalent to octovalent starter molecules, such as water, 1,2-dihydroxypropane, trimethylolpropane, pentaerythrite, glycerine, sorbite, ethylene diamine, and possibly cane sugar. In general, the component (i) has a medium hydroxyl functionality of 2.0–5.0, preferably 2.0–3. Suitable mixtures of this type can be obtained, for example, by subjecting corresponding mixtures of starter molecules of the kind mentioned as examples to a propoxylation reaction. However, it is also possible to mix separately prepared polyhydroxyl polyether with the component (i) to be used according to the invention.

Primary or secondary diamines or polyamines and mixtures thereof are used as the amines according to the invention.

Suitable aromatic amines are, for example: 4,4'diaminodiphenylmethane, 3,3'dimethyl4,4'diaminodiphenylmethane, 3,3'dichlor-4,4'diaminodiphenylmethane, 1,3,5-triisopropyl-2,4-diaminobenzene, 1-methyl-3,5-diethyl-2,4diaminobenzene, 1-methyl-3,5-diethyl-2,6-diaminobenzene, 1,3,5-triethyl-2,4-diaminobenzene and technical mixtures with the last three mentioned compounds, 3,5-di(methylthio)-2,4-toluene diamine, 3,5-di(methylthio)-2,6-toluene diamine and their technical mixtures, 1,2-ethylene-di-(4-amino)thiophenol ether, 1,3-propane diol-di(p-amino)-benzoate, isobutyl-3,5-diamino-4-chlorobenzoate, and 1,3-propylene di-(4-amino)benzoate.

Suitable cycloaliphatic amines are: isophorone diamine, 4,4'diaminodicyclohexylmethane, 3,3'dimethyl-4,4'diaminocyclohexylmethane, N-cyclohexyl-1,3-diaminopropane, N-(β-aminoethyl)piperazine.

Suitable aliphatic amines are, for example: diethylene triamine, triethylene tetramine, tetraethylene pentamine, and di-isopropyl triamine.

The conventional adjuvants and additives c) that are familiar from polyurethane chemistry can be used:

Catalysts to accelerate the various isocyanate addition reactions, such as, in particular, organobismuth or organotin compounds, such as dibutyl tin dilaurate, organic alkaline salts, such as potassium acetate or tertiary amines, e.g., triethylene diamine, dimethylethanol amine or N-ethylene morpholine. These catalysts are generally used in a quantity of up to 2 wt. %, preferably in a quantity of 0.1–1 wt. %, in relation to the total mixture.

Water capturing agents to produce nonfoamed or slightly foamed products, such as zeolite paste, which are used in a quantity between 0.2 and 10 wt. %, preferably between 1 and 5 wt. %.

Foam regulators, i.e., foam stabilizers or destabilizers, preferably those based on polysiloxane. They are added in a quantity up to 2%, preferably between 1 ppm and 1000 ppm, in relation to the total mixture.

Possibly water as an expanding agent, which can be added in amounts up to 5 wt. %, preferably 0.5–2 wt. %.

Possibly physical expanding agents, such as partly halogenated hydrocarbons or other liquid compounds, e.g., dichlorfluormethane or pentane, of which tip to 20% can be added.

Possibly organic or inorganic fire retardants, e.g., phosphates or aluminum hydroxide derivates in quantities up to 20 wt. % for liquid and 50 wt. % for solid agents.

Possibly fillers, e.g., urea, quartz meal, or talc in quantities up to 50%.

In the reaction mixtures to be used according to the invented method, moreover, the individual components are present in such an amount as corresponds to an isocyanate index of 90–150, preferably 120–140. By "isocyanate index" is meant the quotient formed from the number of isocyanate groups present in the reaction mixture and the number of groups present in the reaction mixture that are reactive with respect to isocyanate groups, multiplied by 100, water being considered a difunctional compound in the calculation.

Before carrying out the invented process, the adjuvants and additives c) possibly being used are generally combined with the polyol component b), followed by a processing according to the two-component principle. This means that, in order to produce the reaction mixtures, the polyisocyanate component a) is intensively mixed with the polyol component b) or the mixture of polyol component b) and the adjuvants and additives c). The familiar mixing equipment in the state of the art can be used for this.

BRIEF DESCRIPTION OF THE DRAWINGS

FIG. 1 shows the exponential increase in viscosity as a function of reaction time with and without cross-linking agent as indicated by Examples 4 and 11, respectively.

DESCRIPTION OF THE PROCESS

The process technology is identical to the conventional one for binary resins, i.e., access to the water-bearing region is created by driving in a lance or by drilling a hole and then installing a supply pipe with end seal. The two components are brought in by a double delivery pump, taken separately to the lance or supply pipe, combined with each other here, and mixed by means of a static mixer. After flowing through the lance or pipe, the mixture hardens in the water-bearing zone.

The following sample embodiments according to Tables 1–4 will help further explain the method. All percentages refer to mass percent.

EXAMPLES

In the examples per Tables 3 and 4, the starting components for the system components b) and c) as indicated in Tables 1 and 2 are used:

TABLE 1

| System component b) | Starting components | OH-Index (mg KOH/ g) at 25° C. | Viscosity (mPa · s) |
|---|---|---|---|
| Basic polyol I | Glycerine and Propylene oxide | 380 | 450 |
| Basic polyol II | Saccharose, 1,2-Propane diol, Propylene oxide | 380 | 580 |
| Basic polyol III | Trimethylolpropane Propylene oxide | 380 | 600 |
| Flexibilization polyol I | 1,2-propane diol propylene oxide | 56 | 324 |
| Flexibilization polyol II | 1,2-propane diol propylene oxide | 260 | 73 |
| Flexibilization polyol III | Butane diol tetrahydrofuran | 176 | 277 |
| Flexibilization polyol IV | Triethanol amine Propylene oxide | 27 | 870 |
| Ethylene Glycol | — | 1808 | 16 |
| Diethylene Glycol | — | 1057 | 26 |
| Glycerine | — | 1827 | 750 |
| Castor Oil | — | 160 | 680 |
| Diamine I | (N-(β-aminoethyl)piperazine) | | |
| Diamine II | (N-cyclohexyl-1,3-diaminopropane) | | |
| Diamine III | (3,3'dimethyl-4,4'diaminocyclohexylmethane) | | |
| Diamine IV | 1,3,5-triethyl-2,4-diaminobenzene, technical grade | | |

TABLE 2

| System component c) | Starting components |
|---|---|
| Catalyst I | Dimethylethanolamine |
| Catalyst II | Triethylene diamine, 33% in ethylene glycol |
| Catalyst III | Dibutyl tin dilaurate |
| Catalyst IV | Potassium acetate |
| Catalyst V | 2,4,6-tris(dimethylaminomethyl)phenol |
| Zeolite Paste | Zeolite type T 50% in castor oil |

It follows from Tables 1–4 that, for the binary component polyurethane system according to the invention, a broad palette of starting components [is available?], especially for system component b) (Table 1), as well as for system component c) (Table 2).

Of course, besides the starting components listed, others are also suitable, since the components given in Tables 1 and 2 only concern those which are listed in Tables 3 and 4 in alternating compositions or formulations, provided they have resulted in suitable binary component polyurethane mixtures in trial series in combination with the system components a) mentioned in Tables 3 and 4, which gel to a gellike consistency within fractions of a minute and which are capable, in this quasithixotropic condition, to hold back even strongly flowing water until a hardening has occurred after a time measured in minutes.

TABLE 3

| | | | 1 | | 2 | | 3 | | 4 | | 5 | |
|---|---|---|---|---|---|---|---|---|---|---|---|---|
| | Polyol System components b) and c) | | | | | | | | | | | |
| b) | Basic polyol | % | 50 | I | 50 | I | 40.8 | II | 73 | III | 76 | III |
| " | Flex polyol | % | 39 | I | 38 | IV | 50 | II | 10.9* | | 10 | III |
| " | Cross-linking agent | % | 2 | DEG | 2 | MEG | 1 | DEG | 5 | Glycerin | 5 | MEG |
| " | Diamine | % | 6 | I | 6 | II | 6 | III | 10 | IV | 6 | I |
| c) | Catalyst | % | 1 | I | 1 | II | 0.2 | III | 0.1 | IV | 1 | V |
| " | Zeolite paste | % | 2 | Z.P. | 2 | Z.P. | 2 | Z.P. | 2 | Z.P. | 2 | Z.P. |
| | Hydroxyl number (including amine equivalents) | mgKOH/g | 305 | | 317 | | 328 | | 401 | | 453 | |
| | Viscosity | mPa · s | 378 | | 510 | | 197 | | 517 | | 499 | |
| | Density | g/cm3 | 1.036 | | 1.032 | | 1.028 | | 1.044 | | 1.030 | |
| | Isocyanate System components a) | | | | | | | | | | | |
| | Type | | MDI | | MDI | | Prepolymer | | MDI | | MDI | |
| | NCO content | % | 30.5 | | 30.5 | | 18 | | 30.5 | | 30.5 | |
| | Viscosity | mPa · s | 220 | | 220 | | 250 | | 220 | | 220 | |
| | Density | g/cm3 | 1.23 | | 1.23 | | 1.16 | | 1.23 | | 1.23 | |
| | Reaction | | | | | | | | | | | |
| | 100 g polyol with isocyanate | g | 87.7 | | 92.5 | | 164 | | 128.5 | | 133 | |
| | Gelation time | min | 0.02 | | 0.02 | | 0.06 | | 0.08 | | 0.10 | |
| | Setting time | min | 1.25 | | 0.30 | | 15.0 | | 12.30 | | 2.15 | |
| | NCO coefficient | | 117 | | 119 | | 120 | | 130 | | 120 | |

TABLE 4

| | | | 6 | | 7 | | 8 | | 9 | | 10 | |
|---|---|---|---|---|---|---|---|---|---|---|---|---|
| | Polyol System components b) and c) | | | | | | | | | | | |
| b) | Basic polyol | % | 40 | I | 57 | II | 40 | III | 30 | II | 70 | I |
| " | Flex polyol | % | 43 | IV | 36 | III | 47 | III | 57.9 | III | 15 | IV |
| " | Cross-linking agent | % | 5 | DEG | 2 | MEG | 2 | Glycerin | 2 | DEG | 2 | DEG |
| " | Diamine | % | 8 | II | 8 | I | 8 | III | 8 | III | 10 | IV |
| c) | Catalyst | % | 2 | II | 1 | V | 1 | V | 0.2 | III | 1 | I |
| " | Zeolite paste | % | 2 | Z.P. | 2 | Z.P. | 2 | Z.P | 2 | Z.P. | 2 | Z.P. |
| | Hydroxyl number (including amine equivalents) | mgKOH/g | 310 | | 379 | | 312 | | 278 | | 328 | |
| | Viscosity | mPa · s | 495 | | 434 | | 477 | | 372 | | 341 | |
| | Density | g/cm3 | 1.031 | | 1.041 | | 1.011 | | 1.013 | | 1.054 | |
| | Isocyanate System components a) | | | | | | | | | | | |
| | Type | | Prepolymer | | MDI | | Prepolymer | | Prepolymer | | Prepolymer | |
| | NCO content | % | 18 | | 30.5 | | 13 | | 13 | | 13 | |
| | Viscosity | mPa · s | 250 | | 220 | | 4060 | | 4060 | | 4060 | |
| | Density | g/cm3 | 1.16 | | 1.23 | | 1.011 | | 1.013 | | 1.054 | |
| | Reaction | | | | | | | | | | | |
| | 100 g polyol with isocyanate | g | 146 | | 111 | | 213 | | 192 | | 215 | |
| | Gelation time | min | 0.05 | | 0.08 | | 0.10 | | 0.10 | | 0.20 | |
| | Setting time | min | 1.00 | | 13.00 | | 11.30 | | 7.30 | | 8.00 | |
| | NCO coefficient | | 113 | | 119 | | 119 | | 120 | | 114 | |

TABLE 5

| | | 11 | |
|---|---|---|---|
| Polyol System components b) and c) | | | |
| b) Basic polyol | % | 80 | III |
| " Flex polyol | % | 12.1* | |
| " Cross-linking agent | % | 5.6 | Glycerin |
| " Diamine | % | — | — |
| c) Catalyst | % | 0.1 | IV |
| " Zeolite paste | % | 2.2 | Z.P. |
| Hydroxyl number (including amine equivalents) | mgKOH/g | 444 | |
| Viscosity | mPa · s | 510 | |
| Density | g/cm3 | 1.045 | |
| Isocyanate System components a) | | | |
| Type | | MDI | |
| NCO content | % | 30.5 | |
| Viscosity | mPa · s | 220 | |
| Density | g/cm3 | 1.23 | |
| Reaction | | | |
| 100 g polyol with isocyanate | g | 128.5 | |
| Gelation time | min | — | |
| Setting time | min | 13.00 | |
| NCO coefficient | | 110 | |

*Castor Oil

Tables 3 and 4 present 10 examples containing the corresponding formulation instructions to ensure the aforesaid reaction results.

Table 5, Example 11, presents an example demonstrating the opposite, in which the system component b) was formulated without a diamine, otherwise being similar in composition to Examples 1–10. When such a mixture is used, the special effect of a quickly occurring gelling into a gellike consistency or a quasithixotropic condition suitable to hold back flowing water was not achieved.

As will be seen from FIG. 1, a steep rise in viscosity within fractions of a minute is accomplished only for mixtures in which a diamine cross-linking agent is used, as indicated in the mixture of Example 4, and only a gradual increase in viscosity occurs without a diamine cross-linking agent, as demonstrated by Example 11.

With injection resins based on binary polyurethane resins which do not form a gellike consistency after the mixing of the components, when used in heavily fissured rock, seepage results on account of gravity. In the invented polyurethane resin system based on a binary polyurethane, after the mixing of the low-viscosity individual components in a volume ratio of 1:1, this increases to a greaselike product after 2–12 seconds, which hardens after 4–5 minutes.

The system is to be worked with the familiar injection technique for binary polyurethane mixtures, so that no special dispensing pumps are required.

EXAMPLE 12

A vertically upright plexiglass tube of 1.5 m length and 19 cm inside diameter, having a bore hole in the middle of its surface and being closed by a screen bottom at its lower end, is filled with pebbles of particle-size distribution curve 8–32 mm. Water is allowed to flow through the packing at a rate of 8 liters per minute.

A resin per Formula 2 is pumped into the middle of the tube by means of a binary component pump (flow rate 1 liter per minute) to form a seal.

After 24 s, i.e., 4 kg of pumped resin, the water flow is halted. The essentially nonfoamed resin fills up the free volume of around 20 cm column height. The effluent water is clear.

EXAMPLE 13

Using the same experimental layout as Example 12, a resin mixture of following formula is pumped.

Polyol Component:

45 parts by weight Desmophen 4012 (polypropylene glycol based on trimethylol propane with OH index of 380)

45 parts by weight Desmophen 4000Z (polypropylene glycol based on propylene glycol, OH index 270)

3 parts by weight Triethylene Diamine, 33% in dipropylene glycol 7 parts by weight Desmophen 3600 (polypropylene glycol based on propylene glycol, OH index 50)

After 35 s, i.e., 6 kg of pumped resin, the water flow is halted. The free volume of roughly 70 cm column height is filled with foam of varying density. Large quantities of emulsified polyol, polyurea foam, and foam clumps are found in the effluent.

EXAMPLE 14

The experimental layout of Example 12 is modified as follows. The upper end of the tube is closed by gluing on a circular disk, provided with an opening. Water with a flow rate of 8 liters per minute and a pressure of 20 m water column is admitted to this opening.

Under these conditions, 7 kg of resin must be pumped in 43 s before the water flow is halted. The essentially non-foamed resin fills up the free volume of around 50 cm column height. The effluent is clear.

EXAMPLE 15

With the same experimental layout as in Example 14, a resin mixture as in Example 13 is pumped.

After 60 s and pumping of 10 kg of resin, the experiment is terminated without begin able to halt the water flow, even though the tube below the resin entrance is filled with foam. Considerable quantities of emulsified polyol, polyurea foam, and foam clumps are found in the effluent.

Having thus described the invention it is claimed:

1. A method for sealing geological rock formations to prevent migration of water there through, by intimately mixing an isocyanate component and a polyol component to form a binary polyurethane resin mixture, and immediately introducing said resin mixture under pressure into the geological formation to gel and to harden, the improvement comprising the addition to the polyol component of a minor amount of an unsaturated amine selected from the group consisting essentially of primary and secondary diamines and primary and secondary polyamines in an amount sufficient to cause gelation of the polyurethane resin mixture within a fraction of a minute.

2. The method of claim 1, wherein the amines are aromatic amines selected from the group consisting of 4,4' diaminodiphenyl methane, 3,3' dimethyl-4,4' diaminodiphenylmethane, 3,3' dichlor-4,4' diaminodiphenylmethane, 1,3,5-triisopropyl 1-2,4-diaminobenzene, 1-methyl-3,5-diethyl-2,4-diaminobenzene, 1-methyl-3,5-diethyl-2,6-diaminobenzene, 1,3,5-triethyl-2,4-diaminobenzene, technical mixtures of the last three mentioned compounds, 3,5-di(methylthio)-2,4-toluene diamine, 3,5-di(methylthio)-2,6 toluene diamine technical mixtures of the last two mentioned compounds 1,2-ethylene-di-(4-amino_ thiophenol ether, 1,3-propane diol-di(p-amino)-benzoate, isobutyl-3,5-diamino-4-chlorobenzoate, and 1,3-propylene di-(4-amino) benzoate.

3. The method of claim 1, wherein the amines are cycloaliphatic amines selected from the group consisting of isophorone diamine, 4,4' diaminodicyclohexylmethane, 3,3' dimethyl-4,4' diaminocyclohexylmethane, N-cyclohexy 1-1,3-diaminopropane, and N-(β aminoethyl) piperazine.

4. The method of claim 1, wherein the amines are aliphatic amines selected from the group consisting of diethylene triamine, triethylene tetramine, tetraethylene pentamine, and di-isopropyl triamine.

5. The method according to claim 1, wherein the gelation of the resin mixture occurs before the polyol component present in the mixture can contact and form a stable emulsion with any water present in the geological rock formation.

6. The method according to claim 1, wherein the gelation occurs with a substantial absence of foam formation.

7. The method according to claim 1, wherein the gelation causes a significant increase in viscosity of the resin mixture in less than about 0.20 minutes.

8. The method according to claim 1, wherein the isocyanate component is a liquid at room temperature and comprises a diphenylmethane polyisocyanate having a viscosity at 25° C. of between about 50 and about 500, mPa.s and an NCO content of between about 30 and about 32 weight percent.

9. The method according to claim 1, wherein the isocyanate component is a prepolymer prepared by reacting a polyisocyanate with a long chain polyol in a quantity whereby the NCO/OH molar ratio is between 1:0.005 and 1:03, and the polyol component is a polyvalent alcohol having a molecular weight in the range between about 62 and about 3,000.

10. The method according to claim 8, wherein the polyol component comprises a mixture of polyhydroxy compounds said mixture having an OH index between about 200 and about 500 mg KOH/g. at 25° C.

11. The method according to claim 1, further including the addition to the polyol component of at least one of the following in an amount based on the total weight of the binary mixture: catalysts in an amount up to 2%; water capturing agents in an amount of 0.2 to 10%; foam regulators in an amount up to 2%; water in an amount up to 5%; physical expanding agent up to 20%; fire retardant in an amount up to 20% if solid and 50% if liquid; and fillers in an amount up to 50%.

12. The method according to claim 1, wherein the gelatin time of the polyurethene resin mixture is between about 2 and about 12 seconds.

13. The method according to claim 1, wherein the unsaturated amine is added to the binary resin mixture in an amount of between about 2% and about 10% by weight.

* * * * *